(12) United States Patent
Kim et al.

(10) Patent No.: US 9,856,380 B2
(45) Date of Patent: Jan. 2, 2018

(54) SURFACE TREATMENT COMPOSITION FOR GALVANIZED STEEL SHEET, SURFACE TREATMENT METHOD FOR GALVANIZED STEEL SHEET, AND GALVANISED STEEL SHEET

(71) Applicant: POSCO, Pohang-si, Gyeongsangbuk-do (KR)

(72) Inventors: Hyun-Tae Kim, Kyungsangbook-do (KR); Young-Sool Jin, Gwangyang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 294 days.

(21) Appl. No.: 14/758,225

(22) PCT Filed: Dec. 28, 2012

(86) PCT No.: PCT/KR2012/011664
§ 371 (c)(1),
(2) Date: Jun. 27, 2015

(87) PCT Pub. No.: WO2014/104428
PCT Pub. Date: Jul. 3, 2014

(65) Prior Publication Data
US 2015/0344702 A1   Dec. 3, 2015

(30) Foreign Application Priority Data
Dec. 26, 2012 (KR) .................. 10-2012-0153978

(51) Int. Cl.
| C23C 2/26 | (2006.01) |
| C23C 2/06 | (2006.01) |
| C22C 18/04 | (2006.01) |
| C22C 18/00 | (2006.01) |
| C09D 5/08 | (2006.01) |
| C23C 22/40 | (2006.01) |
| C23C 22/42 | (2006.01) |
| C25D 5/48 | (2006.01) |
| C25D 7/06 | (2006.01) |
| C23C 18/12 | (2006.01) |

(52) U.S. Cl.
CPC .............. *C09D 5/08* (2013.01); *C22C 18/00* (2013.01); *C22C 18/04* (2013.01); *C23C 2/06* (2013.01); *C23C 2/26* (2013.01); *C23C 18/122* (2013.01); *C23C 18/1216* (2013.01); *C23C 18/1241* (2013.01); *C23C 22/40* (2013.01); *C23C 22/42* (2013.01); *C25D 5/48* (2013.01); *C25D 7/0614* (2013.01); *C23C 2222/20* (2013.01); *Y10T 428/12569* (2015.01)

(58) Field of Classification Search
CPC ........... C09D 5/08; C22C 18/04; C22C 18/00; C23C 2/26; C23C 2/06
See application file for complete search history.

(56) References Cited

U.S. PATENT DOCUMENTS

| 2005/0186347 A1 | 8/2005 | Kim et al. |
| 2010/0035055 A1 | 2/2010 | Okai et al. |
| 2010/0068396 A1 | 3/2010 | Kim et al. |
| 2010/0273013 A1 | 10/2010 | Jin et al. |
| 2010/0291379 A1 | 11/2010 | Jo et al. |
| 2012/0204762 A1 | 8/2012 | Albert et al. |

FOREIGN PATENT DOCUMENTS

| CA | 2312807 A1 | 6/1999 |
| CN | 1664167 A | 9/2005 |
| CN | 101535529 A | 9/2009 |
| CN | 101960049 A | 1/2011 |
| CN | 102471891 A | 5/2012 |
| DE | 19754108 A1 | 6/1999 |
| JP | 7-96699 B2 | 10/1995 |
| JP | 2002-129350 A | 5/2002 |
| JP | 2002-332574 A | 11/2002 |
| JP | 2004-183015 | * 7/2004 |
| JP | 2004-183015 A | 7/2004 |
| JP | 2005-146340 A | 6/2005 |
| JP | 2007-162098 A | 6/2007 |
| JP | 2007-182634 A | 7/2007 |
| JP | 2008-544088 A | 12/2008 |
| JP | 2012-026033 A | 2/2012 |
| JP | 2012-177206 A | 9/2012 |
| KR | 10-0685028 | * 2/2007 |
| KR | 10-0685028 B1 | 2/2007 |
| KR | 10-2009-0058571 | * 6/2009 |
| KR | 10-2009-0058571 A | 6/2009 |
| KR | 10-0984935 | * 10/2010 |
| KR | 10-0984935 B1 | 10/2010 |
| KR | 10-1060823 | * 8/2011 |
| KR | 10-1060823 B1 | 8/2011 |
| WO | 2007/061011 A1 | 5/2007 |
| WO | 2009/084849 A2 | 7/2009 |

OTHER PUBLICATIONS

European Communication dated Jan. 8, 2016 issued in European Patent Application No. 12890773.0.
International Search Rport issued in International Application No. PCT/KR2012/011664 dated Jul. 3, 2013, with English Translation.
Notice of Office Action issued in corresponding Japanese Patent Application No. 2015-551039, dated May 24, 2016; with English translation.
Notice of First Office Action issued in corresponding Chinese Patent Application No. 201280078051.5, dated Jul. 5, 2016; with English translation.

* cited by examiner

*Primary Examiner* — Robert Harlan
(74) *Attorney, Agent, or Firm* — McDermott Will & Emery LLP

(57) ABSTRACT

A surface treatment composition for a galvanized steel sheet containing, based on 100 parts by weight of the total solution, 3.0 to 25.0 parts by weight of a silane compound, 0.5 to 5.0 parts by weight of a molybdenum compound, 0.5 to 5.0 parts by weight of a vanadium compound, 0.1 to 3.0 parts by weight of a nickel compound, 0.05 to 1.0 parts by weight of a copper compound, and a remainder of solvent, a surface treatment method for a galvanized steel sheet using the surface treatment composition, and a surface-treated galvanized steel sheet, are provided. Corrosion resistance, blackening resistance, warm water resistance, and conductivity are secured free from concerns regarding the installation of additional equipment for treating chromium, increased manufacturing costs, and environmental pollution.

18 Claims, No Drawings

SURFACE TREATMENT COMPOSITION FOR GALVANIZED STEEL SHEET, SURFACE TREATMENT METHOD FOR GALVANIZED STEEL SHEET, AND GALVANISED STEEL SHEET

RELATED APPLICATIONS

This application is national phase of International Application No. PCT/KR2012/011664, file on Dec. 28, 2013, which in turn claims the benefit of Korean Application No. 10-2012-0153978, filed on Dec. 26, 2012, the disclosure of which Applications are incorporated by reference herein.

TECHNICAL FIELD

The present invention relates to a surface treatment composition for galvanized steel sheet, a surface treatment method for galvanized steel and a galvanized steel sheet, and more particularly, to a surface treatment composition for improving resistance to corrosion and blackening of a steel sheet having a galvanized layer containing magnesium (Mg) and aluminum (Al).

BACKGROUND ART

Steel sheets having a galvanized layer containing magnesium (Mg) and aluminum (Al) may have excellent resistance to red rust corrosion, but since the exposed surface may contain mostly zinc (Zn) or zinc alloy (Zn alloy), white rust corrosion may occur on the surface when exposed to normal environmental conditions, and especially so in humid environments. Further, since magnesium and aluminum contained in a coating layer have better oxygen affinity than zinc, a blackening phenomenon is likely to occur when the amount of oxygen combining with zinc is insufficient.

Conventionally, as part of an anti-corrosive treatment, a metal surface may be pre-treated with chromate in an amount of 5 to 100 mg/m$^2$ to form an organic coating. However, heavy metals such as chromium (Cr) or the like contained in pre-treating agents require additional pre-treatment equipment and processes, and moreover, the safety of steelworkers may be a concern due to heavy metal-containing waste water. Furthermore, manufacturing costs may increase since a hexavalent chromium-containing solution generated from washing water and waste water requires treatment using a special treatment process, and environmental pollution has been a serious problem due to a chromium ion being released from chromate-treated metal coated steel sheets when disposed or during use.

To overcome such problems as well as to secure corrosion resistance in the prior art, surface treatment agents such as an anti-corrosion metal coating agent free of chromium have been developed.

By way of example, Patent Document 1 relates to a surface treatment agent consisting of a zirconium carbonate, a vanadyl ion, and a zirconium compound, which is resistant to corrosion, but prone to blackening.

On the other hand, Patent Document 2 relates to a surface treatment agent consisting of a titanium-based, zirconium-based, phosphoric acid-based, molybdenum-based compound and the like, but which is unable to inhibit blackening in a hot-dip galvanized steel sheet using magnesium (Mg), aluminum (Al), or the like. In addition, Patent Document 3 relates to a surface treatment agent consisting of ammonium molybdate, aqueous dispersion polyurethane resins, isopropylamine, a zirconium ammonium carbonate, an epoxy-based silane coupling agent, and silica sol. However, in this case, due to increased thickness of the surface treatment film, determination of locations where conductivity and weldability are desired may be difficult, and when the thickness is reduced, resistance to corrosion may be insufficient.

RELATED ART DOCUMENT (Patent Document 1) Japanese Patent Laid-Open Publication No. 2002-332574

(Patent Document 2) Japanese Patent Laid-Open Publication No. H7-096699

(Patent Document 3) Japanese Patent Laid-Open Publication No. 2005-146340

DISCLOSURE

Technical Problem

An aspect of the present disclosure may provide a surface treatment composition for galvanized steel sheet having excellent corrosion resistance, blackening resistance, warm water resistance, conductivity and the like, a surface treatment method and a surface-treated galvanized steel sheet using the same.

Technical Solution

According to an aspect of the present disclosure, a surface treatment composition for a galvanized steel sheet may include based on 100 parts by weight of the total solution, 3.0 to 25.0 parts by weight of a silane compound, 0.5 to 5.0 parts by weight of a molybdenum compound, 0.5 to 5.0 parts by weight of a vanadium compound, 0.1 to 3.0 parts by weight of a nickel compound, 0.05 to 1.0 parts by weight of copper compound, and a remainder of solvent.

According to another aspect of the present disclosure, a surface treatment method for a galvanized steel sheet may include applying the surface treatment composition described above to a surface of a galvanized steel sheet and baking at a temperature of 50° C. to 250° C.

According to another aspect of the present disclosure, a galvanized steel sheet may include a base steel sheet, a galvanized layer formed on the base steel sheet, and a coated layer formed on the galvanized layer. The coated layer may be formed of the surface treatment composition.

Advantageous Effects

As set forth above, according to an exemplary embodiment of the present disclosure, a galvanized steel sheet having corrosion resistance, blackening resistance, warm water resistance, and conductivity free from concerns regarding additional equipment installation for treating chromium, increases in manufacturing costs, and environmental pollution may be provided.

BEST MODE

Hereinafter, a surface treatment composition for a galvanized steel sheet, a surface treatment method for galvanized steel sheet and a galvanized steel sheet using the same will be described in detail to easily be implemented by those skilled in the art. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

According to an exemplary embodiment of the present disclosure, a surface treatment composition for galvanized steel sheet containing a metal, in detail, magnesium (Mg) or aluminum (Al) used for household appliances, building materials, vehicles, and the like, a surface treatment method and a surface-treated galvanized steel sheet using the same may be provided. Further, the galvanized steel sheet surface-treated in the method may have excellent corrosion resistance, blackening resistance, warm water resistance, conductivity, and the like.

To this end, according to an exemplary embodiment of the present disclosure, a surface treatment composition for a galvanized steel sheet containing based on 100 parts by weight of the total solution, 3.0 to 25.0 parts by weight of a silane compound, 0.5 to 5.0 parts by weight of a molybdenum compound, 0.5 to 5.0 parts by weight of a vanadium compound, 0.1 to 3.0 parts by weight of a nickel compound, 0.05 to 1.0 parts by weight of a copper compound, and a remainder of solvent may be provided.

The surface treatment composition for a galvanized steel sheet according to an exemplary embodiment of the present disclosure may include a silane compound. The silane compound may include a compound having an amino group and a compound having an epoxy group, and a mixing ratio of the compound having an amino group versus the compound having an epoxy group may be in a range of 1:1.5 to 1:3.0, but is not limited thereto. In a case in which a mixture of the compound having an epoxy group and the compound having an amino group is used, white rust streaks may appear due to a mixing ratio of less than 1.5 having an insufficient improvement in corrosion resistance, and white rust dots may appear through a mixing ratio exceeding 3.0, due to a possible decrease in corrosion resistance.

Examples of the silane compound may include vinyl epoxy silane, vinyl methoxy silane, vinyltrimethoxysilane, 3-aminopropyltriepoxysilane, 3-glycidoxypropyltrimethoxysilane, 3-mercaptopropyltrimethoxysilane, γ-mercaptopropyltrimethoxysilane, and γ-mercaptopropylethoxysilane. The silane compound may be added in an amount of 3 to 25 parts by weight based on 100 parts by weight of the total solution; and, in further detail, 5 to 20 parts by weight. In a case in which less than 3 parts by weight are added, corrosion resistance may be insufficient, and in a case in which more than 25 parts by weight are added, the hardness of the coated film may increase, workability may be reduced, and corrosion resistance may decrease in processing due to the generation of cracking.

In addition, the surface treatment composition for galvanized steel sheet in the present disclosure may include a molybdenum compound. The molybdenum compound may enable blackening resistance by inhibiting the passage of oxygen into the surface treatment film by forming an oxy-acid salt of molybdenum, and finally inhibiting oxidation or an oxygen-deficient amorphous zinc oxide. Examples of the molybdenum compound may be one or more of the following: ammonium molybdate, sodium molybdate, calcium molybdate, molybdenum selenide, lithium molybdate, molybdenum disulfide, molybdenum trioxide, and molybdic acid. The molybdenum compound may be contained in an amount of 0.5 to 5.0 parts by weight based on 100 parts by weight of the total solution. In a case in which less than 0.5 part by weight is added, the effect thereof may be insignificant due to a low generation of an oxyacid salt, and in a case in which more than 5 parts by weight are added, corrosion resistance may be low.

In addition, the surface treatment composition for galvanized steel sheet in the present disclosure may include a vanadium compound. The corrosion resistance of coated steel sheets may be improved from a passivation film being formed on the surface of the coated steel sheet by containing the vanadium compound. Further, because of the presence of the film containing vanadium, when damage occurs in the film, quadrivalent vanadium of the adjacent film may be reduced to trivalent vanadium to form a passivation film on the exposed coated surface, for example, and thus, a corrosion inhibition effect may also be expected. The oxidation numbers of the vanadium compound may be bivalent to pentavalent vanadium, for example one or more of vanadium pentoxide, vanadium trioxide, vanadium dioxide, vanadium oxy-acetylacetonate, vanadium acetylacetonate, vanadium trichloride, and ammonium metavanadate. The vanadium compound may be contained in an amount of 0.5 to 5.0 parts by weight based on 100 parts by weight of the total solution. In a case in which less than 0.5 part by weight is added, corrosion resistance may be insufficient, and in a case in which more than 5 parts by weight are added, there may be a problem in terms of adhesion.

In addition, the surface treatment composition for galvanized steel sheet in the present disclosure may include a nickel compound. The nickel compound may be one or more of nickel acetate, nickel chloride, nickel fluoride, nickel nitrate, sulfamic acid nickel, nickel formate, nickel hydroxide, nickel ammonium sulfate, and nickel carbonate. The nickel compound may be contained in an amount of 0.1 to 3.0 parts by weight based on 100 parts by weight of the total solution. In a case in which less than 0.1 part by weight is added, surface conductivity may not be improved, and in a case in which more than 3 parts by weight are added, cracking may occur in the film, resulting in reduced corrosion resistance.

In addition, the surface treatment composition for galvanized steel sheet in the present disclosure may include a copper compound. The copper compound may be one or more of copper acetylacetonate, copper acetate, copper carbonate, copper chloride, cuprous oxide, copper pyrophosphate, copper nitrate, copper sulfate, copper iodide, cuprous oxide, tetraamine copper sulfate, and copper disodium ethylenediaminetetraacetic acid. The copper compound may be contained in an amount of 0.05 to 1.0 based on 100 parts by weight of the total solution. In a case in which less than 0.05 part by weight is added, corrosion resistance may be ineffective after processing, and in a case in which more than 1.0 part by weight is added, blackening resistance may be low.

The concentration of copper (Cu) and nickel (Ni) contained in the solution may be 0.05 to 0.5 wt % and 0.5 to 3.0 wt % respectively, and the weight ratio of Cu and Ni may be 0.1:1.0 to 0.1:3.0. In a case in which less than 1.0 part by weight is added, an effect of improved blackening resistance may be insufficient, and in a case in which the weight ratio exceeds 3.0, corrosion resistance may decrease.

In addition to the compounds above, the remainder may be a solvent. The solvent may use a mixture of water and ethanol, but may not be limited thereto.

In addition to the compounds above, the surface treatment composition for galvanized steel sheet in the present disclosure may further include based on 100 parts by weight of the total solution, one or more of 1 to 20 parts by weight of a metal compound of group 4A, 0.5 to 10 parts by weight of a phosphoric acid compound, 1.0 to 10 parts by weight of a carboxylic acid, 0.1 to 3.0 parts by weight of a calcium compound, and 3 to 10 parts by weight of an organic acid.

As a metal compound of group 4A, one or more of a zirconium compound and a titanium compound may be used, but the present embodiment may not be limited thereto, and a hafnium compound or a rutherfordium compound may also be used. The blackening phenomenon caused by a thickening of a magnesium oxide may be inhibited by the generation of an oxygen acid salt of group 4A metals, such as zirconium and titanium. The oxygen acid salt of group 4A metals such as zirconium and titanium may be a supply source for a metal oxygen acid ion of group 4A reacting with a magnesium ion released due to an etching reaction. A reaction product may improve corrosion resistance by forming a dense oxide film on an interface.

For the zirconium compound, zirconyl nitrate, zirconyl acetate, zirconium ammonium carbonate, zirconium acetylacetonate, and the like may be included, for example. Further, for the titanium compound, titanium ammonium carbonate, lactic acid titanium chelate, titanium acetonate, and the like may be included.

The compounds above may be contained in an amount of 1 to 20 parts by weight based on 100 parts by weight of the total solution. In a case in which less than 1 part by weight is added, corrosion resistance may be insufficient, and in a case in which more than 20 parts by weight are added, hardness of the film may be excessive, resulting in proneness to cracking.

In addition, the surface treatment composition for galvanized steel sheet in the present disclosure may further include a phosphoric acid compound. The phosphoric acid compound may be a compound of one, two or more selected from a group consisting of a phosphoric acid, s metal salt of a phosphoric acid, and an ammonium salt of a phosphoric acid, which contribute to improving corrosion resistance. Examples of the phosphoric acid in detail may be orthophosphoric acid, pyrophosphate, polyphosphate, metaphosphate, biphosphate, triphosphate, or quadriphosphate, but the present embodiment may not be limited thereto. In detail, examples of the metal salt of a phosphoric acid may be zinc phosphate, nickel phosphate, and magnesium phosphate, but the present embodiment may not be limited thereto. In detail, examples of an ammonium salt of a phosphoric acid may be ammonium phosphate monobasic, ammonium phosphate dibasic, or ammonium phosphate tribasic, but the present embodiment may not be limited thereto.

The contents above may be contained in an amount of 0.5 to 10 by weight based on 100 parts by weight of the total solution. In a case in which less than 0.5 parts by weight is added, an effect of improved corrosion resistance may be ineffective, and in a case in which more than 10 parts by weight are added, corrosion resistance may no longer be effective, and blackening resistance may be reduced.

In addition, the surface treatment composition for galvanized steel sheet in the present disclosure may further include a carboxylic acid. The carboxylic acid may be one or more of acids having a carboxyl functional group. Examples of the carboxylic acid may be a mixture of one, two or more selected from a group consisting of ascorbic acid, tartaric acid, citric acid, tannic acid, benzoic acid, glycol acid, and dihydro-acid, which mainly contribute to a formation of chelate complexes and improved adhesion. In a case in which less than 1.0 part by weight of carboxylic acid parts by weight of the carboxylic acid is added, and adsorption with respect to the steel surface of the components contained in the surface treatment composition may be insignificant, and in a case in which more than 10 parts by weight are added, a problem may occur in the stability of the solution due to excessive acidity.

In addition, the surface treatment composition for galvanized steel sheet in the present disclosure may further include a calcium compound. The calcium compound may be one or more of calcium hydroxy-stearate, calcium carbonate, calcium acetate, calcium chloride, calcium fluoride, calcium hypophosphite, calcium hydroxide, calcium gluconate, calcium nitrate, calcium permanganate, calcium phosphate, calcium silicate, calcium sulfate, calcium stearate, and formic acid. The calcium compound may be contained in an amount of 0.1 to 3.0 parts by weight based on 100 parts by weight of the total solution. In a case in which less than 0.1 part by weight is added, inhibition of blackening may not be effective, and in a case in which more than 3.0 parts by weight are added, workability may be inferior, causing corrosion resistance to be reduced after processing, and conductivity may also be reduced.

In addition, the surface treatment composition for galvanized steel sheet in the present disclosure may further include an organic acid. The organic acid may be one or more of polyvinyl acetate, vinyl acetate, and polyvinyl chloride, but the present embodiment may not be limited thereto. The organic acid may be contained in an amount of 3 to 10 parts by weight based on 100 parts by weight of the total solution. In a case in which less than 3 parts by weight are added, there may be no effect of improved corrosion resistance after processing, and in a case in which more than 10 parts by weight are added, stability may be low during storage.

Furthermore, the surface treatment composition for galvanized steel sheet may optionally further include, as necessary, one or more of a lubricant such as wax to provide lubrication during the surface treatment, an anti-foaming agent to prevent air bubbles appearing during an operation, a leveling agent for leveling the surface of the surface-treated film, a water-soluble resin, and an insoluble resin in a state of being mechanically dispersed in water.

First, a galvanized steel sheet is prepared in order to perform a surface treatment by applying the surface treatment composition as described above onto a surface of a galvanized layer of a galvanized steel sheet.

As a base steel sheet for the galvanized steel sheet, carbon steel, aluminum, aluminum alloy, stainless steel, copper, and the like may be used without restriction. A galvanized layer containing 0.1 wt % or more of magnesium (Mg), 0.1 wt % or more of aluminium (Al), and zinc (Zn) as a remainder may be formed on the base steel sheet. In further detail, the galvanized layer may contain 0.1 to 10 wt % of Mg, 0.1 to 10 wt % of Al, and Zn as a remainder. In a case in which Mg and Al are contained in an amount of 0.1 wt % or more, the galvanized layer may exhibit high corrosion resistance, and in a case in which the amount exceeds 10 wt %, surface hardness may be increased, causing the surface to be brittle and leading to difficulties in processing, and corrosion resistance may also be reduced.

The galvanized layer may further include one or more selected from a group consisting of silicon (Si), beryllium (Be), nickel (Ni), and zirconium (Zr).

The galvanized steel sheet may be a galvanized layer formed on top of a base steel sheet, of which a hot-dip galvanized steel sheet may be mainly used, along with electrolytic galvanized steel sheet, and dry galvanized steel sheet (galvanized through vacuum vapor deposition, ion plating, or the like).

As a pre-treatment process, the thus-prepared galvanized steel sheet may, as necessary, be cleaned with an alkali or acid degreasing agent to remove possible oils or stains attached to the sheet, or may be cleaned in hot water and cleaned with solvents. Afterwards, surface conditioning may be performed using acid, an alkali solution, or the like. In the cleaning of the material surface, a rinsing process may be performed after cleaning so that no cleaning agent may remain on the material surface.

The surface treatment composition of the present disclosure may be applied directly to the surface of the material metal after cleaning, or optionally, after the chemical conversion treatment of phosphates.

Although there may be no particular limitations in the surface treatment of the galvanized steel sheet, typical methods such as a roll coater method of roll transferring coating liquid on the material surface, a method of squeezing a treating agent from a roll after a shower by a shower ring and the like, a method of immersion in a coating liquid, and a method of spraying a coating liquid may be used.

Here, the coating temperature may be between 0° C. to 60° C., or in further detail, 5° C. to 40° C. since the main solvent is water. After applying the coating solution to the galvanized steel sheet in this manner, the steel sheet may be baked at a temperature between 50° C. to 250° C. During this process, when the baking temperature is lower than 50° C., the coating layer may not dry sufficiently, resulting in insufficient adhesiveness and corrosion resistance, and when the temperature exceeds 250° C., cooling of the steel sheet may be difficult after drying. A baking treatment at a high temperature may instead result in the deterioration of the coating film, reducing performance in quality.

The surface treatment composition in the present disclosure may be applied to the steel sheet to form a dry film having a thickness of 0.1 to 1.2 g/m², or in further detail, 0.2 to 1.0 g/m², and may be left to dry for 0.1 to 30 seconds. Here, when the dry film thickness is 0.1 g/m² or less, corrosion resistance may be insufficient, and when the thickness is 1.2 g/m² or more, conductivity may be reduced.

Hereinafter, embodiments in the present disclosure will be described in further detail, but the present embodiment may not be limited thereto.

EXAMPLE 1

1. Steel Sheet Preparation

A hot-dip galvanized steel sheet (coating weight on one side of 60 g/m²) consisting of a galvanized layer containing 3 wt % of Mg, 2.5 wt % of Al, and a remainder of Zn was prepared as an example of the hot-dip galvanized steel sheet of the present disclosure.

2. Steel Sheet Pre-Treatment

The surface of the prepared hot-dip galvanized steel sheet has been cleaned by spray treating the surface using a medium-alkali degreasing agent (CLN-3645: product of Dae Han Parkerizing Co., Ltd.) diluted to 2% for 20 seconds at a temperature of 60° C. in order to remove foreign substances adhered to the surface such as dust and oils, and washed with tap water to remove any remaining alkali solution.

3. Manufacturing of the Surface Treatment Composition

For the manufacturing of the surface treatment composition in the present disclosure, chemical substances found in Table 2 below were mixed to a concentration, according to the Table, of a mixture of 3 parts by weight of ethanol and 10 parts by weight of water (pure) based on 100 parts by weight of the total solution, and the mixture was stirred for 30 minutes or more so that the chemical substances could be thoroughly mixed or dissolved.

In detail, the chemical substances used are, ammonium zirconium carbonate as a metal compound of 4A-group, ammonium phosphate as a phosphate compound, ascorbic acid as a carboxylic acid compound, 3-glycidoxypropyltrimethoxysilane and 3-aminopropyltriethoxysilane as silane compounds hydrolyzed by a ratio of 2:1, ammonium molybdate as a molybdenum compound, vanadyl acetate as a vanadium compound, nickel nitrate as a nickel compound, calcium nitrate as a calcium compound, copper nitrate as a copper compound, and vinyl acetate as an organic acid.

4. Surface Treatment Process

The compositions manufactured under the conditions of Table 2 were applied to the hot-dip galvanized steel sheet with a bar coater and baked at a temperature of 150° C. to create a coating layer having a thickness of 300 to 600 mg/m².

5. Method of Testing and Evaluation

The corrosion resistance, blackening resistance, warm water resistance, and conductivity of the pre-treated galvanized steel sheet were measured by the following methods.

(1) Corrosion Resistance

The occurrence rate of white rust was observed by use of a salt spray test according to ASTM B117. The evaluation was conducted with respect to a flat portion and Erichsen 6 mm extrusion process unit. The evaluation criteria are shown in Table 1.

TABLE 1

| Category | Flat Portion | Erichsen Process Unit |
|---|---|---|
| Criterion | Within 5% of white rust occurrence area | Within 5% of white rust occurrence area |
| ○ | Within more than 120-hour period | Within more than 72-hour period |
| Δ | Within more than 72 to 120-hour period | Within 48 to 72-hour period |
| X | Within less than 72-hour period | Within less than 48-hour period |

(2) Blackening Resistance

Blackening resistance was evaluated according to the degree of discoloration by measuring the difference in brightness and color saturation using a device which measures the degree of whiteness, an X-Rite 8200, after leaving the steel sheet to stand for 120 hours in a humid atmosphere of 95% moisture at 55° C.

$$\text{Degree of discoloration } \Delta E = \sqrt{(\Delta L^2 + \Delta a^2 + \Delta b^2)}$$

(ΔL: difference in degree of whiteness, Δa: difference in degree of redness, Δb: difference in degree of yellowness)

With regard to degrees of discoloration calculated by the formula above, "○" is 3 or less, "Δ" is between 3 and 5, and "x" is 5 or more.

(3) Warm Water Resistance

Warm water resistance was evaluated according to the degree of discoloration by measuring the difference in brightness and saturation using a device which measures the degree of whiteness, an X-Rite 8200, during a deposition of 120 hours at 50° C. after the steel sheet was maintained so that the conductivity of water reached 200 μs.

$$\text{Degree of discoloration } \Delta E = \sqrt{(\Delta L^2 + \Delta a^2 + \Delta b^2)}$$

(ΔL: difference in degree of whiteness, Δa: difference in degree of redness, Δb: difference in degree of yellowness)

With respect to degrees of discoloration calculated by the formula above, "○" is 3 or less, "Δ" is between 3 and 5, and "x" is 5 or more.

(4) Surface Conductivity

With respect to surface resistance in the conductivity of a film treated specimen, "○" is less than 0.5mΩ, "Δ" is between 0.5 mΩ and 1.0 mΩ, and "x" is 1.0 mΩ or more.

6. Test Results

The test results of the evaluation above are summarized in Table 2. As shown in Table 2, the exemplary embodiment using the surface treatment composition according to the present disclosure demonstrates excellent corrosion resistance, blackening resistance, warm water resistance, and conductivity.

TABLE 2

| No. | Metal Compound of Group 4A | Phosphoric Acid Compound | Carboxylic Acid | Silane Compound | Vanadium Compound | Molybdenum Compound | Nickel Compound | Calcium Compound | Copper Compound | Organic Acid | Corrosion Resistance Flat Portion | Corrosion Resistance After Processing | Blackening Resistance | Warm Water Resistance | Conductivity | Category |
|---|---|---|---|---|---|---|---|---|---|---|---|---|---|---|---|---|
| 1 | 0.9 | 4 | 5 | 7 | 3 | 1.5 | 0.5 | 1.0 | 0.5 | 5 | X | X | X | X | X | Comparative Example |
| 2 | 1 | 4 | 5 | 7 | 3 | 1.5 | 0.5 | 1.0 | 0.5 | 5 | ○ | ○ | ○ | ○ | ○ | Exemplary Embodiment |
| 3 | 20 | 4 | 5 | 7 | 3 | 1.5 | 0.5 | 1.0 | 0.5 | 5 | ○ | ○ | ○ | ○ | ○ | Exemplary Embodiment |
| 4 | 21 | 4 | 5 | 7 | 3 | 1.5 | 0.5 | 1.0 | 0.5 | 5 | X | X | △ | X | ○ | Comparative Example |
| 5 | 10 | 0.4 | 5 | 7 | 3 | 1.5 | 0.5 | 1.0 | 0.5 | 5 | X | X | ○ | X | X | Comparative Example |
| 6 | 10 | 0.5 | 5 | 7 | 3 | 1.5 | 0.5 | 1.0 | 0.5 | 5 | ○ | ○ | ○ | ○ | ○ | Exemplary Embodiment |
| 7 | 10 | 10 | 5 | 7 | 3 | 1.5 | 0.5 | 1.0 | 0.5 | 5 | ○ | ○ | ○ | ○ | ○ | Exemplary Embodiment |
| 8 | 10 | 11 | 5 | 7 | 3 | 1.5 | 0.5 | 1.0 | 0.5 | 5 | X | X | X | X | △ | Comparative Example |
| 9 | 10 | 4 | 0.9 | 7 | 3 | 1.5 | 0.5 | 1.0 | 0.5 | 5 | X | X | X | X | X | Comparative Example |
| 10 | 10 | 4 | 1.0 | 7 | 3 | 1.5 | 0.5 | 1.0 | 0.5 | 5 | ○ | ○ | ○ | ○ | ○ | Exemplary Embodiment |
| 11 | 10 | 4 | 10 | 7 | 3 | 1.5 | 0.5 | 1.0 | 0.5 | 5 | ○ | ○ | ○ | ○ | ○ | Exemplary Embodiment |
| 12 | 10 | 4 | 11 | 7 | 3 | 1.5 | 0.5 | 1.0 | 0.5 | 5 | X | X | X | X | X | Comparative Example |
| 13 | 10 | 4 | 5 | 2 | 3 | 1.5 | 0.5 | 1.0 | 0.5 | 5 | X | X | △ | X | X | Comparative Example |
| 14 | 10 | 4 | 5 | 3 | 3 | 1.5 | 0.5 | 1.0 | 0.5 | 5 | ○ | △ | ○ | ○ | ○ | Exemplary Embodiment |
| 15 | 10 | 4 | 5 | 25 | 3 | 1.5 | 0.5 | 1.0 | 0.5 | 5 | ○ | ○ | ○ | ○ | ○ | Exemplary Embodiment |
| 16 | 10 | 4 | 5 | 26 | 3 | 1.5 | 0.5 | 1.0 | 0.5 | 5 | X | X | X | X | X | Comparative Example |
| 17 | 10 | 4 | 5 | 7 | 0.4 | 1.5 | 0.5 | 1.0 | 0.5 | 5 | X | X | X | X | X | Comparative Example |
| 18 | 10 | 4 | 5 | 7 | 0.5 | 1.5 | 0.5 | 1.0 | 0.5 | 5 | ○ | ○ | ○ | ○ | ○ | Exemplary Embodiment |
| 19 | 10 | 4 | 5 | 7 | 5.0 | 1.5 | 0.5 | 1.0 | 0.5 | 5 | ○ | ○ | ○ | ○ | ○ | Exemplary Embodiment |
| 20 | 10 | 4 | 5 | 7 | 5.1 | 1.5 | 0.5 | 1.0 | 0.5 | 5 | X | X | X | X | X | Comparative Example |
| 21 | 10 | 4 | 5 | 7 | 3 | 0.4 | 0.5 | 1.0 | 0.5 | 5 | X | X | X | X | △ | Comparative Example |
| 22 | 10 | 4 | 5 | 7 | 3 | 0.5 | 0.5 | 1.0 | 0.5 | 5 | ○ | ○ | ○ | ○ | ○ | Exemplary Embodiment |
| 23 | 10 | 4 | 5 | 7 | 3 | 5.0 | 0.5 | 1.0 | 0.5 | 5 | ○ | ○ | ○ | ○ | ○ | Exemplary Embodiment |
| 24 | 10 | 4 | 5 | 7 | 3 | 5.1 | 0.5 | 1.0 | 0.5 | 5 | X | X | X | X | X | Comparative Example |
| 25 | 10 | 4 | 5 | 7 | 3 | 1.5 | 0.09 | 1.0 | 0.5 | 5 | X | X | X | X | X | Comparative Example |
| 26 | 10 | 4 | 5 | 7 | 3 | 1.5 | 0.1 | 1.0 | 0.5 | 5 | △ | △ | △ | △ | ○ | Exemplary Embodiment |
| 27 | 10 | 4 | 5 | 7 | 3 | 1.5 | 3.0 | 1.0 | 0.5 | 5 | ○ | ○ | ○ | ○ | ○ | Exemplary Embodiment |
| 28 | 10 | 4 | 5 | 7 | 3 | 1.5 | 3.1 | 1.0 | 0.5 | 5 | X | X | X | X | X | Comparative Example |
| 29 | 10 | 4 | 5 | 7 | 3 | 1.5 | 0.5 | 0.09 | 0.5 | 5 | X | X | X | X | X | Comparative Example |
| 30 | 10 | 4 | 5 | 7 | 3 | 1.5 | 0.5 | 0.1 | 0.5 | 5 | ○ | ○ | ○ | ○ | ○ | Exemplary Embodiment |
| 31 | 10 | 4 | 5 | 7 | 3 | 1.5 | 0.5 | 3.0 | 0.5 | 5 | ○ | ○ | ○ | ○ | ○ | Exemplary Embodiment |
| 32 | 10 | 4 | 5 | 7 | 3 | 1.5 | 0.5 | 3.1 | 0.5 | 5 | X | X | X | X | X | Comparative Example |
| 33 | 10 | 4 | 5 | 7 | 3 | 1.5 | 0.5 | 1.0 | 0.04 | 5 | △ | △ | △ | △ | ○ | Exemplary Embodiment |
| 34 | 10 | 4 | 5 | 7 | 3 | 1.5 | 0.5 | 1.0 | 0.05 | 5 | ○ | ○ | ○ | ○ | ○ | Exemplary Embodiment |
| 35 | 10 | 4 | 5 | 7 | 3 | 1.5 | 0.5 | 1.0 | 1.0 | 5 | ○ | ○ | ○ | ○ | ○ | Exemplary Embodiment |
| 36 | 10 | 4 | 5 | 7 | 3 | 1.5 | 0.5 | 1.0 | 1.1 | 5 | X | X | X | X | X | Comparative Example |
| 37 | 10 | 4 | 5 | 7 | 3 | 1.5 | 0.5 | 1.0 | 0.5 | 2.9 | X | X | X | △ | X | Comparative Example |
| 38 | 10 | 4 | 5 | 7 | 3 | 1.5 | 0.5 | 1.0 | 0.5 | 3 | ○ | ○ | ○ | ○ | ○ | Exemplary Embodiment |
| 39 | 10 | 4 | 5 | 7 | 3 | 1.5 | 0.5 | 1.0 | 0.5 | 10 | ○ | ○ | ○ | ○ | ○ | Exemplary Embodiment |
| 40 | 10 | 4 | 5 | 7 | 3 | 1.5 | 0.5 | 1.0 | 0.5 | 11 | X | X | X | X | X | Comparative Example |

EXAMPLE 2

The preparation and pre-treatment of the steel sheet have been conducted in the same manner as in Example 1.

However, the manufacturing of the surface treatment composition was performed as follows.

based on 100 parts by weight of the total solution, 10 parts by weight of ammonium zirconium carbonate, 4 parts by weight of ammonium phosphate, 5 parts by weight of ascorbic acid, 7 parts by weight of 3-glycidoxypropyltrimethoxysilane and 3-aminopropyltriethoxysilane as silane compounds hydrolyzed by a ratio of 2:1, 3 parts by weight of vanadyl acetate, 1.5 parts by weight of ammonium molybdate, 0.5 parts by weight of nickel nitrate, 1.0 parts by weight of calcium nitrate, 0.5 parts by weight of copper nitrate, and 5 parts by weight of vinyl acetate were mixed into a mixture of 3 parts by weight of ethanol and 10 parts by weight of water (pure), and the mixture was stirred for 30 minutes or more so that the chemical substances could be thoroughly mixed or dissolved. The parts by weight of the remainder were adjusted with water so that the total solution would be 100 parts by weight in order to manufacture the surface treatment composition.

Afterwards, the surface treatment process, and the test and the evaluation methods, were also conducted in the same manner as in Example 1.

However, due to the differences in the dry film thickness of the coating layer, changes in the quality of the thicknesses were evaluated and shown in Table 3 below.

TABLE 3

| | | Quality | | | | | |
|---|---|---|---|---|---|---|---|
| | Dry Film | Corrosion Resistance | | | | | |
| No. | Thickness (mg/m$^2$) | Flat Portion | After Processing | Blackening Resistance | Warm Water Resistance | Conductivity | Notes |
| 1 | 0.09 | X | X | X | X | ○ | Comparative Example |
| 2 | 0.1 | ○ | ○ | ○ | ○ | ○ | Exemplary |
| 3 | 1.2 | ○ | ○ | ○ | ○ | ○ | Embodiment |
| 4 | 1.3 | ○ | X | ○ | ○ | X | Comparative example |

As shown in Table 3 above, when the dry film thickness is between 0.1 to 1.2 g/m$^2$, corrosion resistance, blackening resistance, warm water resistance, and conductivity displayed excellence.

The invention claimed is:

1. A surface treatment composition for a galvanized steel sheet, comprising:
    based on 100 parts by weight of the total solution, 3.0 to 25.0 parts by weight of a silane compound;
    0.5 to 5.0 parts by weight of a molybdenum compound;
    0.5 to 5.0 parts by weight of a vanadium compound;
    0.1 to 3.0 parts by weight of a nickel compound;
    0.05 to 1.0 parts by weight of a copper compound; and
    a remainder of solvent.

2. The surface treatment composition for a galvanized steel sheet of claim 1, further comprising based on 100 parts by weight of the total solution, one or more of:
    1 to 20 parts by weight of one or more metal compound selected from the group consisting of a zirconium compound and a titanium compound capable of forming an oxygen acid salt on a metal surface;
    0.5 to 10 parts by weight of a phosphoric acid compound;
    1.0 to 10 parts by weight of a carboxylic acid;
    0.1 to 3.0 parts by weight of a calcium compound; and
    3 to 10 parts by weight of an organic acid.

3. The surface treatment composition for a galvanized steel sheet of claim 1, wherein the solvent is a mixture of water and ethanol.

4. The surface treatment composition for a galvanized steel sheet of claim 1, wherein the solution contains 0.05 to 0.5 wt % of copper (Cu) and 0.5 to 3.0 wt % of nickel (Ni), and the weight ratio of Cu and Ni is 0.1:1.0 to 0.1:3.0.

5. The surface treatment composition for a galvanized steel sheet of claim 2, wherein the phosphoric acid compound is a mixture of one, two or more selected from a group consisting of orthophosphoric acid, pyrophosphate, polyphosphate, metaphosphate, biphosphate, triphosphate, quadriphosphate, metal salt of a phosphoric acid, and ammonium salt of a phosphoric acid.

6. The surface treatment composition for a galvanized steel sheet of claim 2, wherein the carboxylic acid is a mixture of one or more selected from a group consisting of ascorbic acid, tartaric acid, citric acid, tannic acid, benzoic acid, glycol acid, and dihydro-acid.

7. The surface treatment composition for a galvanized steel sheet of claim 1, wherein the silane compound includes a compound having an amino group and a compound having an epoxy group, and a mixing ratio of the compound having an amino group versus the compound having an epoxy group is 1:1.5 to 1:3.0.

8. The surface treatment composition for a galvanized steel sheet of claim 1, wherein the molybdenum compound is one or more of ammonium molybdate, sodium molybdate, calcium molybdate, molybdenum selenide, lithium molybdate, molybdenum disulfide, molybdenum trioxide, and molybdic acid.

9. The surface treatment composition for a galvanized steel sheet of claim 1, wherein the vanadium compound is one or more of vanadium pentoxide, vanadium trioxide, vanadium dioxide, vanadium oxy-acetylacetonate, vanadium acetylacetonate, vanadium trichloride, and ammonium metavanadate.

10. The surface treatment composition for a galvanized steel sheet of claim 1, wherein the nickel compound is one or more of nickel acetate, nickel chloride, nickel fluoride, nickel nitrate, sulfamic acid nickel, nickel formate, nickel hydroxide, nickel ammonium sulfate, and nickel carbonate.

11. The surface treatment composition for a galvanized steel sheet of claim 2, wherein the calcium compound is one or more of calcium hydroxy-stearate, calcium carbonate, calcium acetate, calcium chloride, calcium fluoride, calcium hypophosphite, calcium hydroxide, calcium gluconate, calcium nitrate, calcium permanganate, calcium phosphate, calcium silicate, calcium sulfate, calcium stearate, and formic acid.

12. The surface treatment composition for a galvanized steel sheet of claim 1, wherein the copper compound is one or more of copper acetylacetonate, copper acetate, copper carbonate, copper chloride, cuprous oxide, copper pyrophosphate, copper nitrate, copper sulfate, copper iodide, cuprous oxide, tetraamine copper sulfate, and copper disodium ethylenediaminetetraacetic acid.

13. The surface treatment composition for a galvanized steel sheet of claim 2, wherein the organic acid is one or more of polyvinyl acetate, vinyl acetate, and polyvinyl chloride.

14. The surface treatment composition for a galvanized steel sheet of claim 1, further comprising one or more of wax, a leveling agent, an anti-foaming agent, a water-soluble resin, and an insoluble resin in a state of being mechanically dispersed in water.

15. A galvanized steel sheet comprising:
a base steel sheet;
a galvanized layer formed on the base steel sheet; and
a coated layer formed on the galvanized layer,
wherein the coated layer is formed of the surface treatment composition of claim 1.

16. The galvanized steel sheet of claim 15, wherein a dry film thickness of the coated layer is 0.1 to 1.2 $g/m^2$.

17. The galvanized steel sheet of claim 15, wherein the galvanized layer contains 0.1 wt % or more of magnesium (Mg), 0.1 wt % or more of aluminum (Al), and zinc (Zn) as a remainder.

18. The galvanized steel sheet of claim 17, wherein the galvanized layer further comprises one or more selected from a group consisting of silicon (Si), beryllium (Be), nickel (Ni), and zirconium (Zr).

* * * * *